United States Patent [19]

Roche

[11]  4,150,302

[45]  Apr. 17, 1979

[54] EMERGENCY LIGHT BATTERY CHARGER CIRCUIT

[76] Inventor: Thomas F. Roche, 21 W. Main St., Merrimac, Mass. 01860

[21] Appl. No.: 790,589

[22] Filed: Apr. 25, 1977

[51] Int. Cl.$^2$ ............................ H02J 7/10; H02J 9/02
[52] U.S. Cl. ........................................ 307/66; 362/20; 362/183
[58] Field of Search ............................ 307/66; 362/20

[56] References Cited

U.S. PATENT DOCUMENTS

| 3,573,483 | 4/1971 | White ...................................... 307/66 |
| 3,939,359 | 2/1976 | Nehushtan ............................. 307/66 |

Primary Examiner—L. T. Hix
Assistant Examiner—S. D. Schreyer
Attorney, Agent, or Firm—Weingarten, Maxham & Schurgin

[57] ABSTRACT

A battery charger circuit for providing a charging current to a rechargeable battery from AC line voltage. The charger circuit is especially adapted for use in an emergency light and includes circuitry to provide automatic charging current shut-off when the battery is fully charged. Failure of AC power is detected by the charger circuit, and current is applied to an emergency lamp in response to such failure. Circuitry is included for monitoring the charge state of the battery and for interrupting discharge current to the lamp from the battery when the charge state falls below a predetermined limit. Provision is included for use of the battery charger circuit in a portable lantern configuration.

6 Claims, 1 Drawing Figure

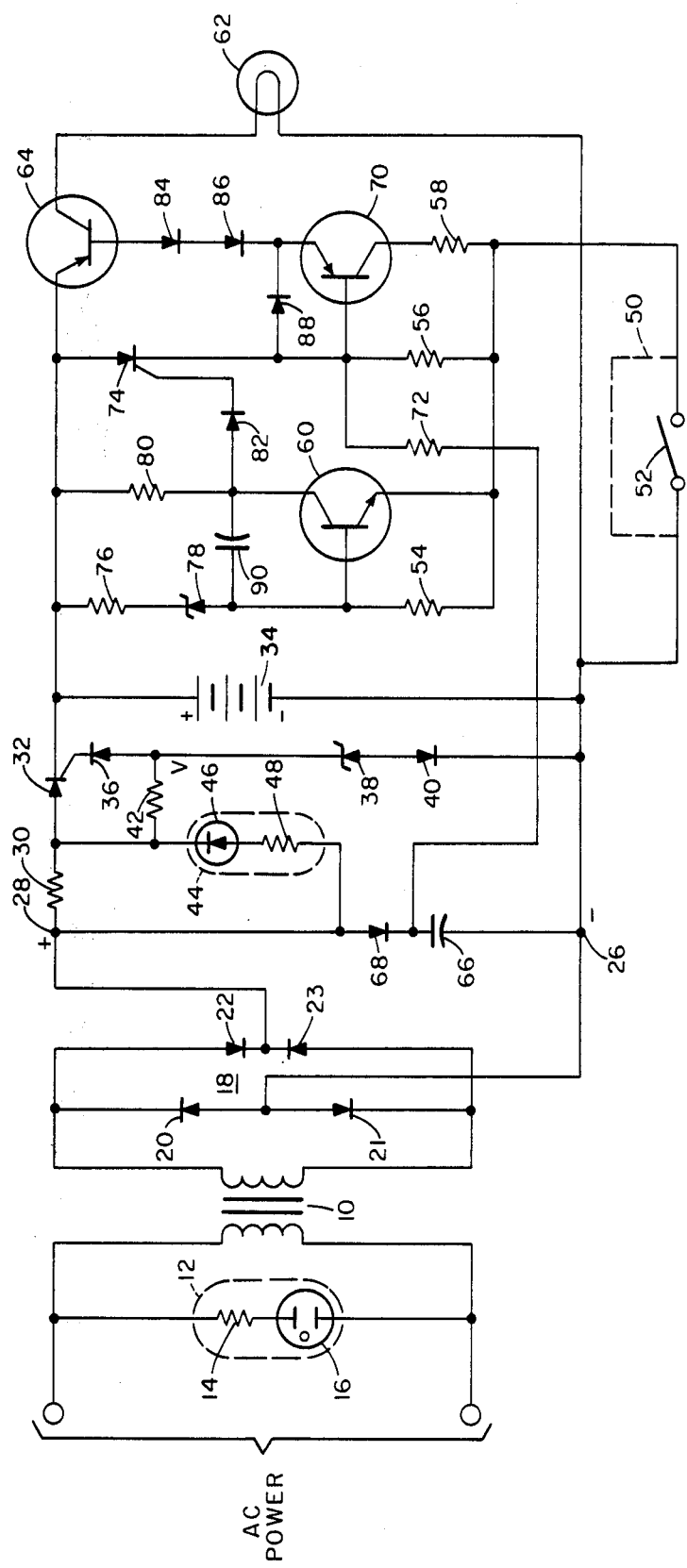

EMERGENCY LIGHT BATTERY CHARGER CIRCUIT

BACKGROUND OF THE INVENTION

Many applications exist today for lamps powered by rechargeable batteries in combination with automatic battery charger circuits adapted to operate from AC power lines. One particular application where such circuits are used is in emergency lights which provide emergency illumination upon failure of AC power. Generally, such emergency illumination is only required for a short period following the failure of AC power to permit safe exit from dangerous, darkened areas, such as stairways, and to provide time for procuring other means of temporary illumination. However, most emergency lights available today continue to provide illumination for as long as the power failure continues, until the battery is fully discharged. Since most rechargeable batteries suffer damage and/or have their useful lives shortened when discharged beyond a certain point, such operation requires that batteries be frequently checked and replaced following each power outage. While low-charge cut-off circuits are known, the addition of such circuitry to the power failure detection circuitry and full-charge monitor circuitry already required for proper rechargeable emergency light operation entails even more complication and expense. Additionally, in many solid-state emergency light circuits, the loss of AC power is detected by the circuitry which requires direct connection to the power line voltage, creating potential safety habits.

SUMMARY OF THE INVENTION

Briefly, the present invention includes an emergency light circuit which maintains a battery in a fully-charged condition during periods when AC power is present, and detects a failure of the AC power, providing current to an emergency lamp in response to such failure. The circuit further includes means for monitoring the voltage of the battery and for interrupting the discharge current when the charge state of the battery reaches a predetermined level. Economy of circuitry design is effected by the dual use of a solid-state switch both as the relay for applying current to the emergency lamp upon loss of AC power and as the low-voltage disconnect circuitry for monitoring the charge state of the battery. Additionally, the novel solid-state relay circuitry of the present invention is connected in the secondary of the charger transformer, eliminating safety hazards of conventional emergency lights having such circuitry directly connected to the AC lines. By means of a simple circuit modification, the present circuit may be also used in a rechargeable portable lantern configuration.

DESCRIPTION OF THE DRAWINGS

The FIGURE shows a schematic diagram of a preferred embodiment of the present invention.

DETAILED DESCRIPTION OF THE PREFERRED EMBODIMENT

Referring now to the FIGURE, one preferred implementation of the emergency light battery charger of the present invention is shown in detail. This implementation provides the above-described advantages, including a low-charge cut-off of discharge current from the battery, AC power sensing in the secondary for safety, and the dual use of solid-state circuitry for both voltage sensing and low voltage disconnect functions. The preferred embodiment described herein may be easily modified for use as a portable rechargeable light merely by the addition of a single-pole switch. It should be appreciated that the circuit described in the following detailed explanation is only exemplary of the present invention and should not be construed as implying any limitation thereon.

Referring to the FIGURE, AC power from the power lines is applied to the primary of a transformer 10. If desired, an optional pilot light assembly 12 may be connected between the AC lines as shown to provide an indication of the presence or absence of AC power. The pilot light assembly 12 shown is a conventional, commercially-available module composed of a current-limiting resistor 14 and a neon indicator 16. Transformer 10 is a step-down transformer which converts the high voltage present at the input to a lower voltage suitable for charging the lamp battery and for powering the solid-state electronics associated therewith and described in detail below.

The output from transformer 10 is applied to a full-wave rectifier 18 including diodes 20 through 23. These diodes are connected in a conventional bridge circuit with the junction of diodes 21 and 23 providing a negative output terminal 26 and the junction of diodes 20 and 22 providing a positive output terminal 28. The positive output from the rectifier circuit is applied via current-limiting resistor 30 and silicon-controlled-rectifier (SCR) 32 to the positive terminals of a battery 34. The negative terminal of battery 34 is returned to the negative terminal 26 of rectifier circuit 18. The gate terminal of SCR 32 is returned to the negative terminal 26 via diode 36, zener diode 38, and diode 40. The junction of zener diode 38 and diode 36 is connected to the positive terminal through resistors 42 and 30, and thus, this junction is maintained at a requested voltage, denoted as V, equal to the zener voltage plus the forward voltage drop across diode 40. Diode 40 is provided in series with zener diode 38 to provide protection in the event that battery 34 is improperly installed with reverse polarity.

The charging circuit operates in the following manner. When the voltage of battery 34 falls below the voltage V, current will flow through diode 36 into the gate terminal of SCR 32, turning on the SCR and causing a charging current to flow through the SCR, charging battery 34. This charging current will continue to flow until battery 34 is sufficiently charged so that its output voltage equals the voltage V. At this point, gate current to SCR 32 will no longer flow through diode 36, and SCR 32 turns off, interrupting the charging current to battery 34. Diode 36 prevents battery 34 from being discharged by any reverse leakage current from the cathode to the gate of SCR 32.

An optional charging current indicator 44 may be provided if desired. As shown in the FIGURE, this charging indicator may include a light-emitting diode 46 in series with resistor 48, which series combination is connected in parallel with resistor 30. During periods when charging current is flowing through SCR 32, the voltage drop developed across resistor 30, due to this flow of current, is applied to indicator 44, illuminating it. Once battery 34 has been fully charged, significant current no longer flows through resistor 30 and indicator 44 is extinguished.

The present circuit may be used either to sense the loss of AC power and to provide emergency illumination in response thereto, or as a rechargeable lantern circuit which provides illumination upon actuation of a switch. To provide the emergency illumination function, a jumper wire 50 is connected across or in place of a switch 52 between the negative terminal 26 and the junction of resistors 54, 56, 58 and the emitter of transistor 60. To select portable lantern operation, jumper wire 50 is cut or otherwise disconnected, and switch 52 turns the lantern on and off, as described below.

Upon loss of AC power, the circuit provides emergency illumination in the following manner. An emergency lamp 62, typically a sealed beam lamp, is connected in series with a transistor 64 across battery 34. When AC power is present, a capacitor 66 charges up to the positive potential through diode 68 connected to the positive terminal 28 of full-wave rectifier circuit 18. This positive voltage is applied to the base of a transistor 70 through a resistive voltage divider made up of resistors 72 and 56. The emitter of transistor 70 is connected to the base of transistor 64, and transistor 70 controls the base current to transistor 64. Normally, an SCR 74 is turned off and transistor 70 will be held in an off state by the positive voltage applied to its base by the resistive dividers 72 and 56. The voltage to which capacitor 66 charges is proportional to the AC line voltage; and the values of resistors 56 and 72 determine at what threshold voltage on capacitor 66, and hence at what line voltage, transistor 70 will turn on. When the AC voltage falls to a value less than this threshold, base current flows from the base of transistor 70 through 56 to the negative terminal 26, turning on transistor 70. The emitter current of transistor 70 provides a base current for transistor 64 and transistor 64 switches into a conducting state, providing current from battery 34 to lamp 62. Load resistor 58 in the collector circuit of transistor 70 provides current limiting for the collector current of transistor 70.

When the present circuit is used in a rechargeable, portable lantern, jumper wire 50 is removed and the connection of resistors 54, 56, 58 and the emitter of transistor 60 to ground is controlled by switch 52. When the rechargeable lantern is disconnected from AC power and switch 52 is closed, current is applied to lamp 62 in the manner described above. When switch 52 is opened, collector current through transistor 70 is interrupted, causing the base current to transistor 64 to be removed, and transistor 64 goes to the off state, turning off lamp 62.

When battery 34 is providing current to lamp 62 in either the emergency light configuration or the rechargeable, portable lantern configuration, as described above, the voltage of battery 34 is monitored by the present circuit; and when the voltage of battery 34 falls below a predetermined limit, the discharge current from battery 34 is interrupted. This prevents battery 34 from being damaged or from having its life reduced by being completely discharged.

The voltage of battery 34 appears across a voltage divider, including resistor 76, zener diode 78, and resistor 54 connected in series across battery 34. The voltage across resistor 54 is applied to the base to emitter junction of transistor 60. The resulting base current of transistor 60 is given by:

$$I_B = \frac{V_{BAT} - V_{ZEN}}{R_{76}} - V_{BE}\left(\frac{1}{R_{76}} - \frac{1}{R_{54}}\right) \quad (1)$$

where $I_B$ is the base current of transistor 60, $V_{BAT}$ is the battery voltage, $V_{ZEN}$ is the zener voltage of zener diode 78, $V_{BE}$ is the base to emitter voltage of transistor 60, and $R_{76}$ and $R_{54}$ are the values of resistors 76 and 54. Equation (1) is valid for non-negative values of $I_B$. When the voltage on battery 34 is sufficient to turn on transistor 60, the voltage drop across load resistor 80 applied via a diode 82 to the gate terminal of SCR 74 holds SCR 74 in the off state. When the battery voltage drops to a value which causes the base current $I_B$ to go to zero, as determined by equation (1), transistor 60 turns off, the voltage drop across 80 drops to a very small value, and the positive potential from battery 34 is applied via resistor 80 and diode 82 to the gate terminal of SCR 74, turning on SCR 74. With SCR 74 in the on state, the base of transistor 70 rises to a voltage equal to the voltage of battery 34 less the forward conduction drop across SCR 74, and this causes transistor 70 to turn off, removing the base current from transistor 64.

The base of transistor 64 is connected to the emitter of transistor 70 via series-connected diodes 84 and 86. The emitter of transistor 64 is connected to the emitter of transistor 70 via SCR 74 and a diode 88. The voltage drops across diodes 84 and 86 compensate for the voltage drops across SCR 74 and diode 88, causing the base and emitter of transistor 64 to be effectively shorted when SCR 74 is on. This reduces the collector leakage current in transistor 64 when it is in the off state, due to the fact that $I_{CES}$ is less than $I_{CEO}$, which otherwise would contribute to the discharge of battery 34.

Capacitor 90 connected between the base and emitter of transistor 60 acts to suppress spurious transients which might otherwise fire SCR 74 prematurely. Capacitor 90 also serves to decrease the turn-on time of transistor 60 when the circuit is being used in a portable, rechargeable lantern and switch 52 is closed. The presence of capacitor 90 between the base and emitter of transistor 60 also prevents the entire voltage from battery 34 from being applied across the base to collector junction of transistor 60 which switch 52 is closed.

There has been described a unique circuit which advantageously provides for the charging of a battery and monitoring of the discharge of the battery in a rechargeable emergency light or portable lantern. It should be appreciated that modifications of the preferred embodiment described may be made by those of ordinary skill in the art in utilizing the teaching of the present application in various applications. Therefore, the description herein of a preferred embodiment is not to be taken as a limitation to the present invention, and the scope of the present invention is to be determined entirely in accordance with the appended claims.

What is claimed is:

1. Apparatus for energizing an emergency light upon detection of a power failure, comprising:
   a rechargeable battery having positive and negative terminals;
   a transformer having a primary winding including means for connection of AC power thereto, and a secondary winding;
   rectifier means, coupled to said secondary winding and having at least two output terminals, for providing a DC voltage for charging said battery;

charging means connected to said rectifier means for providing a regulated charging current to said battery when said battery voltage is below a first predetermined level, and for interrupting said charging current when said battery voltage has exceeded said first predetermined level;

a lamp for providing illumination only upon the loss of AC power;

detection means, isolated from the AC power and responsive to a loss of voltage across the secondary winding of said transformer, for detecting loss of AC power and for providing current from the battery to the lamp only upon said loss, including:

a first transistor having the emitter and collector thereof connected in series with said battery and said lamp; and means responsive to the DC voltage from said rectifier means for providing a base signal to the base terminal of said first transistor to cause conduction of said first transistor when said DC voltage falls below a second predetermined level;

means for monitoring the battery voltage and for interrupting the current provided by the battery to said lamp by turning off said first transistor when the battery voltage falls below a third predetermined level, to prevent said battery from being further discharged, including:

means for turning off said first transistor and for reducing the collector leakage current of said first transistor, thereby reducing the current discharging said battery, including:

a first pair of diodes connecting the base of said first transistor with a first node;

a second pair of diodes connecting the emitter of said first transistor with the first node, and wherein one of said second pair of diodes is a silicon-controlled rectifier;

and wherein said means for monitoring includes means for turning on the silicon-controlled rectifier in response to said battery voltage falling below the third predetermined level.

2. The circuit of claim 1 wherein said charging means includes:

a second silicon-controlled rectifier having anode, cathode, and gate terminals, the anode and cathode terminals of said second silicon-controlled rectifier being connected series betweeen one output terminal of said rectifier means and the positive terminal of said battery;

means for connecting the second terminal of said battery to the other output terminal of said rectifier means;

a zener diode; and means for connecting said zener diode between said second silicon-controlled rectifier gate terminal and the negative terminal of said battery to provide said regulated charging current to said battery.

3. The circuit of claim 1 wherein said circuit is adapted for use in a portable lantern and further including a switch for selectively preventing said base signal from being applied to the base of said transistor.

4. The apparatus of claim 1 wherein said means for monitoring the battery voltage includes:

a second transistor;

a second zener diode in parallel with said battery for providing a voltage to the base of said second transistor;

the collector of said second transistor being coupled to the positive terminal of said battery and the gate of said silicon-controlled rectifier.

5. The apparatus of claim 4 wherein said means responsive to the DC voltage includes:

a third transistor with its emitter connected to the base of said first transistor; and capacitor means for providing to the base of the third transistor a voltage proportional to the DC voltage from the rectifier.

6. The apparatus of claim 1 including an indicator which is operative when the battery is being charged.

* * * * *